O. J. BACKUS.
Water Motors for Sewing-Machines.

No. 146,120. Patented Jan. 6, 1874.

4 Sheets--Sheet 1.

4 Sheets--Sheet 2.

O. J. BACKUS.
Water Motors for Sewing-Machines.

No. 146,120. Patented Jan. 6, 1874.

Witnesses.
R. T. Campbell
J. N. Campbell

Inventor
Oscar J. Backus

4 Sheets--Sheet 3.

O. J. BACKUS.
Water Motors for Sewing-Machines.

No. 146,120. Patented Jan. 6, 1874.

Witnesses:
R. T. Campbell
J. N. Campbell

Inventor
Oscar J. Backus
by
Mason, Fenwick & Lawrence

4 Sheets--Sheet 4.
O. J. BACKUS.
Water Motors for Sewing-Machines.
No. 146,120. Patented Jan. 6, 1874.
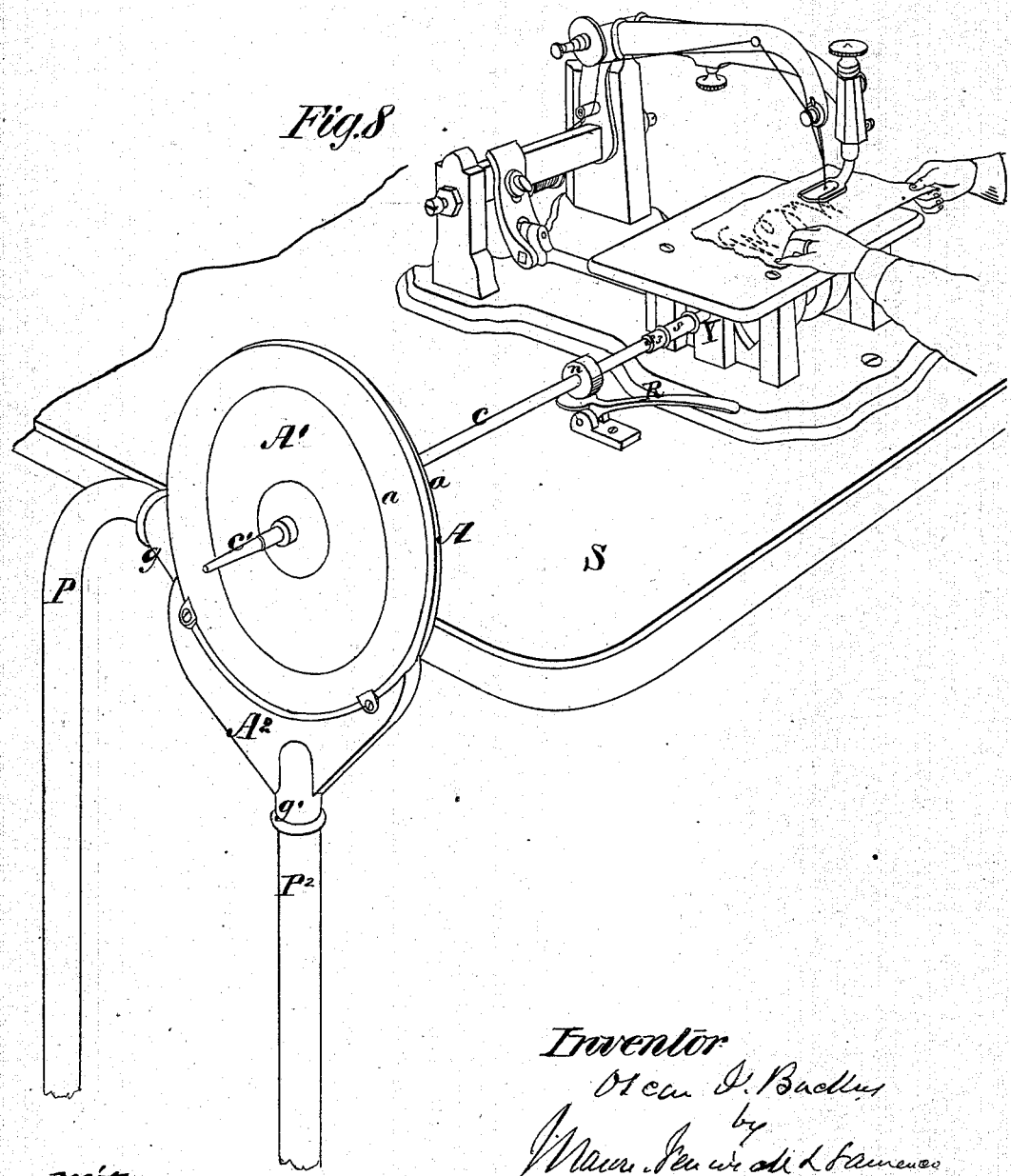
Witnesses.
Inventor

UNITED STATES PATENT OFFICE.

OSCAR J. BACKUS, OF SAN FRANCISCO, CALIFORNIA.

IMPROVEMENT IN WATER-MOTORS FOR SEWING-MACHINES.

Specification forming part of Letters Patent No. 146,120, dated January 6, 1874; application filed June 5, 1873.

*To all whom it may concern:*

Be it known that I, OSCAR J. BACKUS, of San Francisco, in the county of San Francisco and State of California, have invented certain Improvements on the Construction of Water-Wheel Motors for Sewing-Machines; and I do hereby declare that the following is a full, clear, and exact description thereof, reference being had to the accompanying drawings making part of this specification, in which—

Figure 1:
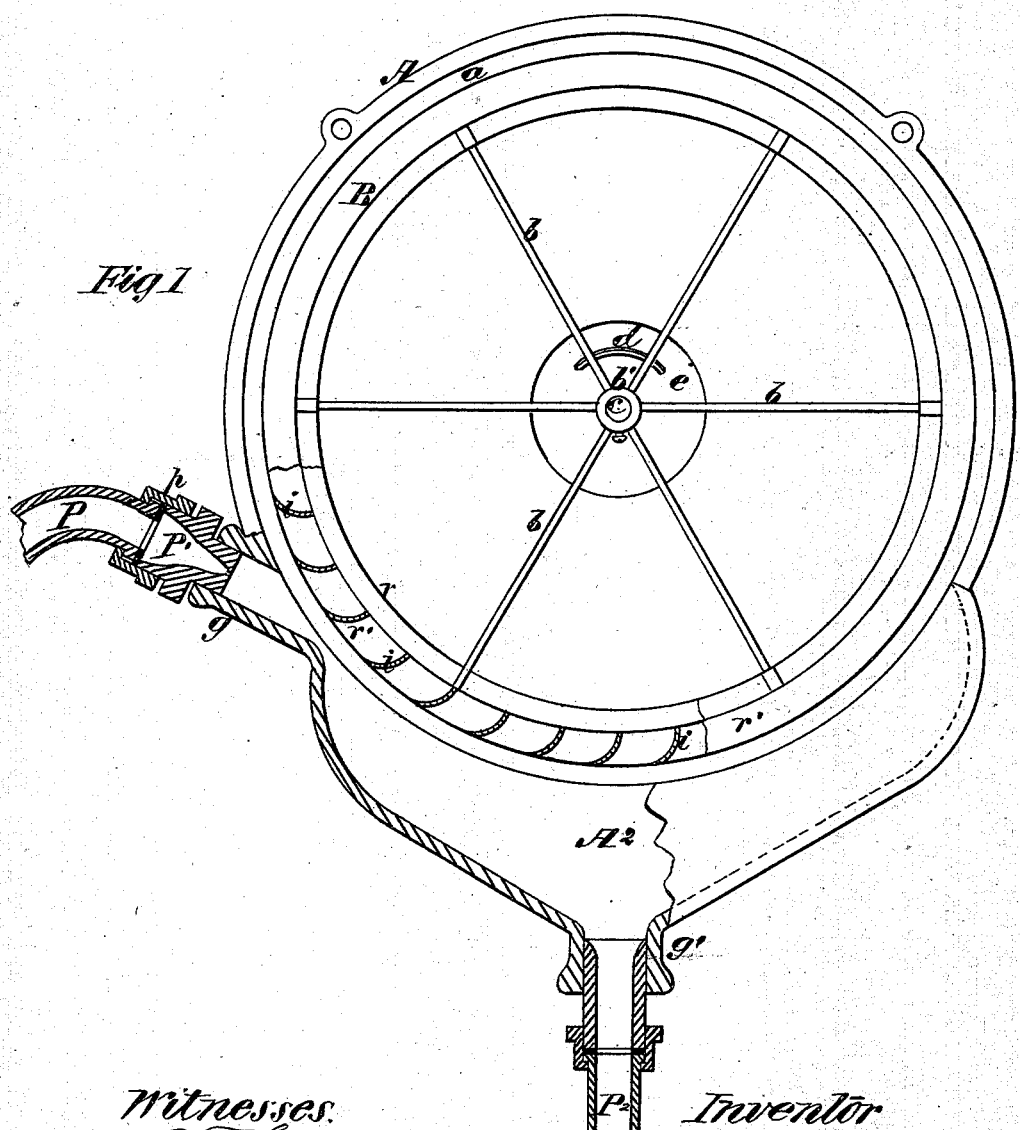
Figure 2:
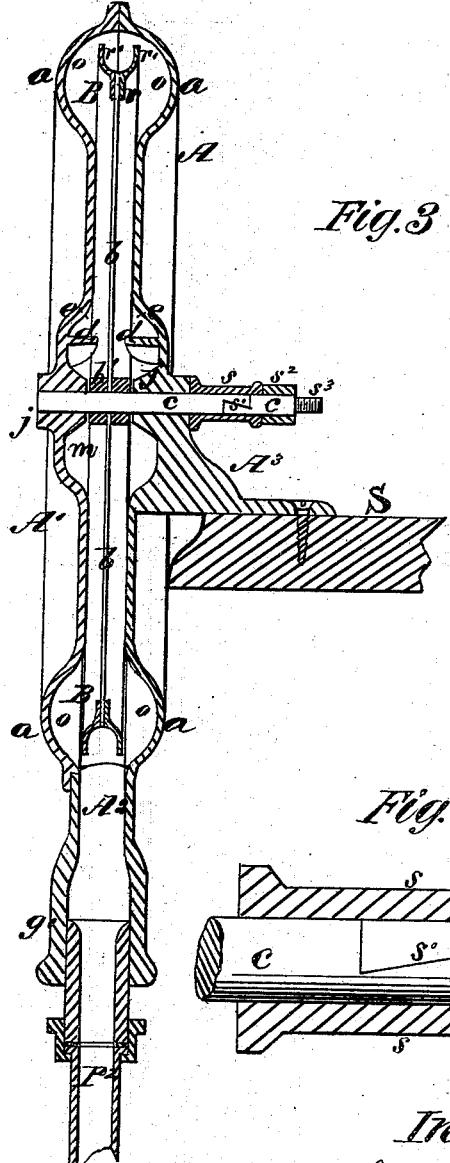
Figure 3:
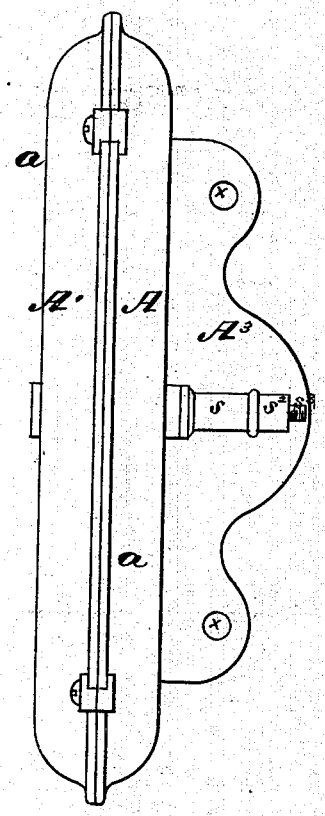
Figure 4:
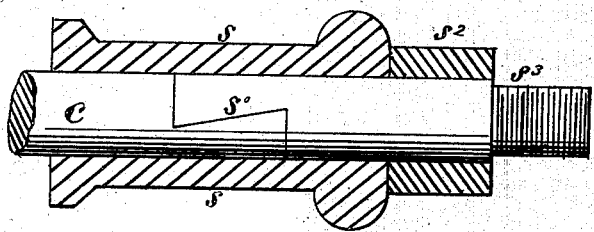
Figure 5:
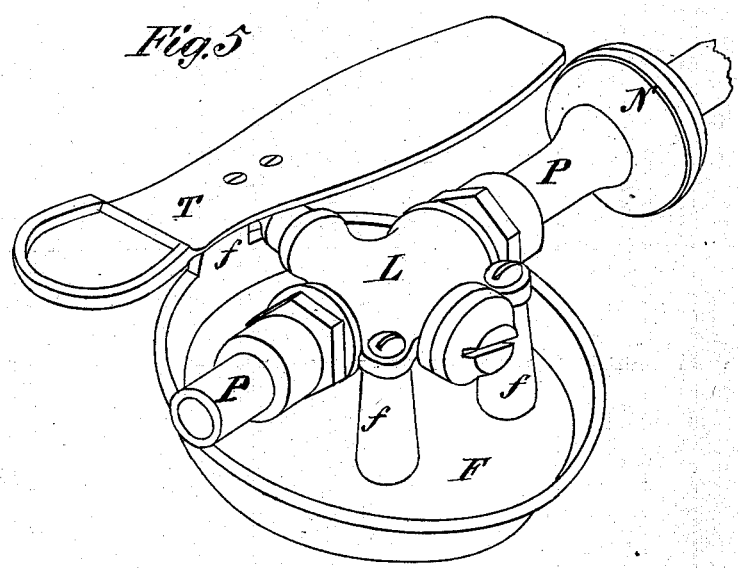
Figure 6:
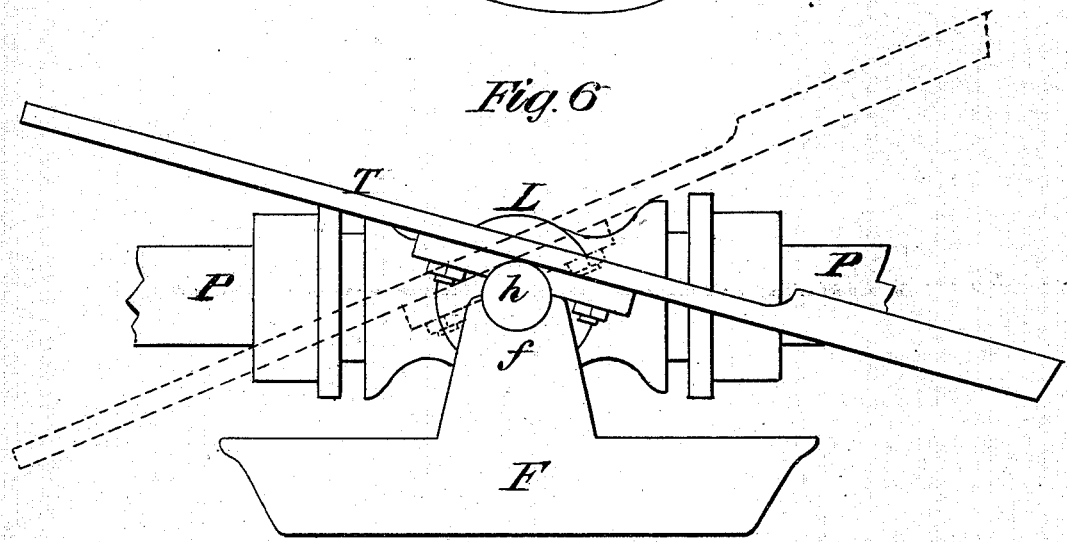
Figure 7:
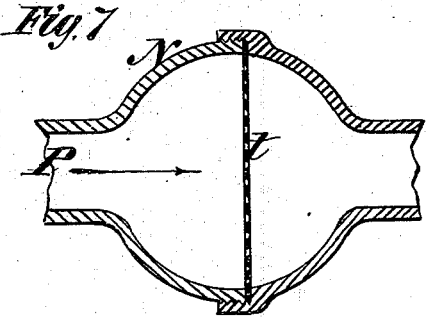

Figure 1, Plate 1, is a sectional view of one plate of the wheel-case with the wheel therein, shown partly in section. Fig. 2, Plate 2, is a vertical diametrical section through the wheel-case and wheel applied to a sewing-machine table-top. Fig. 3, Plate 2, is a top view of the wheel-case. Fig. 4, Plate 2, is a sectional view, showing the coupling for connecting the wheel-shaft to the driving-shaft of a sewing-machine. Fig. 5, Plate 3, is a perspective view of the treadle-cock and drip-pan. Fig. 6, Plate 3, is an elevation of one side of the same. Fig. 7, Plate 3, is a section through the strainer. Fig. 8, Plate 4, is a perspective view, showing the motor applied on the table-top of a sewing-machine and connected to the driving-shaft thereof.

Similar letters of reference indicate corresponding parts in the several figures.

This invention has for its object, first, the construction of a waste-water pocket, an induction-nozzle, and a discharge-nozzle by casting them on one of the plates constituting the casing which incloses the wheel; second, forming in the center of each casing-plate an annular internal depression surrounding an extended wheel-shaft bearing; third, casting a bracket-extension on the external side of one of the plates of the wheel-casing, which shall serve not only for attaching the motor onto the top of a sewing-machine table, but at its upper end form a bearing for the motor-shaft; fourth, the employment of a drip-pan beneath the pedal-cock, constructed so as to serve not only the purpose of a drip-pan, but also as a support for the water-cock and treadle; fifth, the application of a detachable strainer-vessel to the water-supply pipe at a point between the injecting-nozzle and the treadle-cock, which vessel is of an enlarged capacity as compared with the diameter of the supply-pipe to which it is attached.

The following description of my invention will enable others skilled in the art to understand it.

The wheel-case, which I have represented in the annexed drawings, consists of two castings, A and A$^1$, of circular form, which are bolted together, as shown in Figs. 2, 3, and 8, so as to form a chamber for the water-wheel B, and a receptacle for receiving and discharging the waste water. The plate A is constructed with an annular depression, $a$, for receiving the outer bucket-carrying portion of the wheel, and also with a central annular depression, $e$, which latter surrounds a long bearing, $j$, for the wheel-shaft $c$. The lower portion of this plate A is constructed with an upwardly-flaring pocket, A$^2$, of less width than the width of the casing, taken through the annular space $o$, but of a length nearly equal to one-third the circumference of the casing. The bottom of this pocket converges to a discharge-nozzle, $g'$, to which a waste-water pipe, P$^2$, is suitably secured. At one end of the pocket A$^2$ another nozzle, $g$, is formed, to which a finely-perforated nozzle, P$^1$, is applied, to which nozzle the water inlet-pipe P is secured. (Shown in Figs. 1 and 8.) On the outside of the plate A, below the shaft-bearing $j$, is a right-angular flat extension, A$^3$, which is the bracket through which screws are passed for securing the motor to the table-top S of a sewing-machine. This bracket is formed homogeneous with the plate A, and during the act of casting the plate, and is so constructed that, while it serves the purpose of securing the motor to the table-top, it also forms a part of one of the long bearings $j$, for the wheel-shaft $c$. The bracket A$^3$ is extended down the plate A sufficiently below the point at which it forms one of the bearings $j$ of the motor-shaft $c$ to allow a proper elevation of such shaft above the table-top S, when the motor is placed in position as shown in Figs. 3 and 8, thereby enabling a direct connection to be made between the shaft $c$ of the motor and the driving-shaft of the sewing-machine. The pocket A$^2$, the two nozzles $g$ $g'$, and the bracket A$^3$, are all cast with, and form part of, the plate A. The plate A$^1$ has neither a bracket nor a pocket formed on it. In other respects it is like the plate A—that is to say, it has an annular depression, $a$, a central depression, $e$, and an extended hub or bearing,

*j*. When the two plates A A¹ are bolted together an annular laterally-enlarged chamber, *o*, is formed for the bucket-carrying portion of the wheel B, and an annular laterally-extended chamber, *m*, for receiving "eye-brows" or water-sheds *d d*. This chamber it will be seen surrounds the shaft *c* and its bearings *j*, and its concavity is such that any drip-water flowing down the inner face of plate A or over the "eye-brows" *d d* will be conveyed past and below the wheel-shaft *c* without escaping from the wheel-case between the bearing *j* and said shaft. By forming this central chamber *m*, that portion of the wheel-case between it can be contracted laterally, as shown in Fig. 2, and besides this the bearings *j j* can be made of the proper length for affording good steady supports for the wheel-shaft *c* without occupying more space laterally than is occupied by the width of the wheel-case, as illustrated by Fig. 2. It will be seen by reference to Fig. 1 that the buckets *i* of the wheel B are successively struck by a minute stream of water from the nozzle P¹, which stream is directed downward and inward in a line which is tangent to a circle within the circumference of the wheel, thus utilizing the percussive force of the stream to drive the wheel. Now, in order to prevent the water from reacting or "backing" upon the buckets and retarding the speed or momentum of the wheel, the pocket commences directly beneath the said injecting-nozzle P¹ and terminates at a point opposite this nozzle or a little above it. A pocket thus constructed will catch all the water which falls from the buckets and conduct it directly down to the discharge-pipe P². The wheel-case is secured onto the table-top of a sewing-machine by means of the bracket A³, as above stated, and the shaft *c* of the wheel B is connected to the driving-shaft Y of a sewing-machine by extending said wheel-shaft and making it of two parts, which are coupled by means of two lapped half dovetails, $s^1$, and a sliding tube or collar, *s*, the latter being held in place by means of an india-rubber tube, $s^2$. That portion of the wheel-shaft *c* which is connected to the driving-shaft of the sewing-machine has a male screw, $s^3$, formed on it, which is tapped into a screw-socket made into the end of the sewing-machine shaft Y.

Fig. 4, Plate 2, shows clearly the improved coupling and uncoupling device. It is made by simply beveling and shouldering the ends of two sections of the shaft *c*, slipping the tube *s* over these ends when lapped, and adjusting the india-rubber tube $s^2$ up to its place against the tube *s*, thus making a simple and cheap coupling and uncoupling, and one which any lady can manipulate conveniently. By slipping the tube *s* off the lapped joint $s^1$, the motor is disconnected from the sewing-machine, and either or both machines can be detached from the table-top. The wheel which is represented in the annexed drawings, but not herein claimed, is composed of two plates, which are each struck up and secured together, as shown in Figs. 1 and 2, so as to form two flaring flanges, *r' r'*, for receiving between them the buckets *i*, and also an internal stiffening-rib, *r*. This bucket-receiving portion of the wheel is connected, by wire spokes *b*, to a hub, *b'*, which is secured to the wheel-shaft *c*. I thus obtain a very light wheel, which possesses great strength and durability, and which is not liable to warp out of its truism. I prefer this construction of water-wheel for my motor; but wheels which are constructed differently may be used with the improvements herein claimed. On the extended portion of the wheel-shaft *c*, between the motor and the driving-shaft of the sewing-machine, I secure a small wheel, *n*, beneath which is the frictional end of a brake-lever, R, which is pivoted to a plate that is secured fast upon the table-top S, as shown in Fig. 8. By means of this brake an attendant at a sewing-machine can quickly check its speed.

For the purpose of starting and stopping the machine, a single way-cock, L, is used, through which water passes on its way from the service-pipes to the wheel-case. This cock is located on the floor, beneath the table of the sewing-machine, in a convenient position to the feet of the operator, and it is mounted upon standards *f*, which rise from a drip-pan, F. The plug *h* of the cock is extended, so as to form a support for a pedal or foot-lever, T, which is secured to it, and by means of which an operator can let on or cut off the flow of water, and also regulate the flow at will. The drip-pan F is of such size that it will catch any water which might leak from the cock, plug, or the joint connection thereof, and thus protect a carpet from wet. Between the cock L and the nozzle-injector P¹, I apply to the pipe P a vessel, N, made of two detachable parts, and containing a perforated diaphragm, *t*, the object of which is to prevent small fish and foreign substances in the water from choking up the nozzle P¹. By making the vessel N of two detachable parts, as shown by Fig. 7, it can be safely removed and cleaned when it becomes foul on simply closing the cock L; and hence I apply this device between the cock and the motor, and so avoid the trouble of cutting off the flow of water to the cock L while in the act of removing and cleaning said vessel.

Having described my invention, what I claim as new, and desire to secure by Letters Patent, is—

1. The single casing-plate A, having an induction-nozzle, a waste-water pocket, and a discharge-nozzle formed thereon, substantially as and for the purpose described.

2. The annular chamber *m*, between plates A A¹, surrounding the elongated bearings for the wheel-shaft *c*, substantially as described.

3. The bracket extension A³, cast on the plate A, below the wheel-shaft *c*, so as to serve not only as a bracket, but at its upper end form a bearing for the motor-shaft $c$, substantially as described.

4. A drip-pan, F, constructed with standards $f$ to support the water-cock L and treadle T, thus serving the purpose of a waste-water receptacle, as well as a support for said cock and treadle, substantially as shown.

5. An enlarged detachable vessel, N, with a perforated diaphragm therein, arranged and applied to the pipe P, between the nozzle P¹ and the treadle-cock L, substantially as and for the purpose described.

OSCAR JEROME BACKUS.

Witnesses:
JOHN D. FRASER,
ALEX. K. HACKETT.